United States Patent [19]

Satzler

[11] Patent Number: 4,517,039
[45] Date of Patent: * May 14, 1985

[54] METHOD AND APPARATUS FOR MAKING BRAIDED REINFORCED HOSE

[75] Inventor: Ronald L. Satzler, Princeville, Ill.

[73] Assignee: Caterpillar Tractor Co., Peoria, Ill.

[*] Notice: The portion of the term of this patent subsequent to Feb. 26, 2002 has been disclaimed.

[21] Appl. No.: 509,110

[22] Filed: Jun. 29, 1983

[51] Int. Cl.³ .................. B29D 23/05; B65H 81/00
[52] U.S. Cl. ..................... 156/149; 156/244.13; 156/393; 264/103; 425/114; 425/133.1
[58] Field of Search ............... 156/149, 393, 244.13; 264/103, 209.1, 209.4, 209.5; 425/113, 133.1

[56] References Cited

U.S. PATENT DOCUMENTS

| 3,586,558 | 6/1971 | Galloway et al. | 156/149 |
| 3,755,032 | 8/1973 | Higbee | 156/86 |
| 3,776,794 | 12/1973 | Ingham | 156/143 |
| 3,915,618 | 10/1975 | Feucht et al. | 425/503 |
| 4,155,790 | 5/1979 | Galloway | 156/149 |
| 4,161,379 | 7/1979 | Sudyk | 425/112 |
| 4,175,992 | 11/1979 | Grawey | 156/143 |
| 4,180,429 | 12/1979 | Alber | 156/143 |
| 4,202,718 | 5/1980 | Mizutani et al. | 156/171 |
| 4,268,333 | 5/1981 | Schwarz | 156/161 |

FOREIGN PATENT DOCUMENTS 2557718 8/1976 Fed. Rep. of Germany .

OTHER PUBLICATIONS

Karg Braiders-Advertising Brochure.
The Rockwell 225-II-Advertising Brochure.

Primary Examiner—Michael Ball
Attorney, Agent, or Firm—J. W. Burrows

[57] ABSTRACT

A method and apparatus is provided for manufacturing a reinforced elastomeric hose. Other reinforced hoses are prepared in individual stations for particular parts of the reinforced hose consequently requiring large amounts of manufacturing floor space. Still other hoses that are made while utilizing small amounts of floor space do not provide a high strength braided reinforcement member. A reinforced hose (10) is produced by continuously braiding a tubular reinforcement member (16) on a mandrel (50), progressively removing the reinforcement member from the mandrel (50), and at approximately the same axial location extruding a liner (26) and cover (28) onto the reinforcement member (16) adjacent the mandrel (50). After leaving the extruders (33,34), the formed hose (10) is pulled at a linear rate faster than the hose (10) is being produced in order to change the braid angle of the braided reinforcement member (16) to a predetermined smaller braid angle. As the hose (10) leaves the extruders (33,34), it is pulled through a curing mechanism (30) to cure the hose (10) while the braid angle is at the predetermined angle. Upon release and cooling of the hose, the hose rebounds to an optimum braid angle of approximately 54° 44'. The braided reinforcement member (16) provides the high strength characteristics while the extruding of the liner (26) and cover (28) at approximately the same axial location near the braiding mandrel (50) minimizes the manufacturing floor space and reduce cost.

11 Claims, 3 Drawing Figures

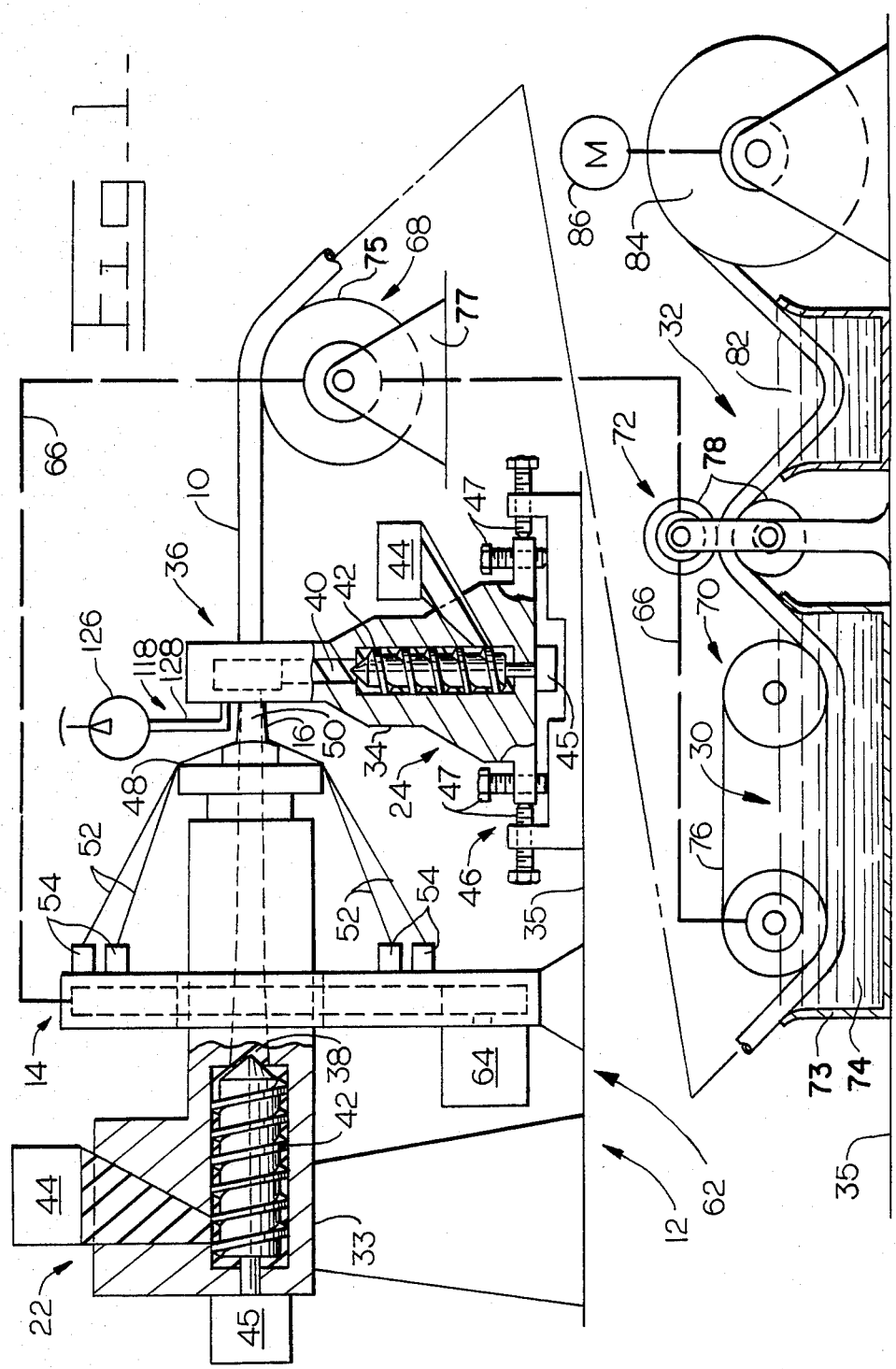

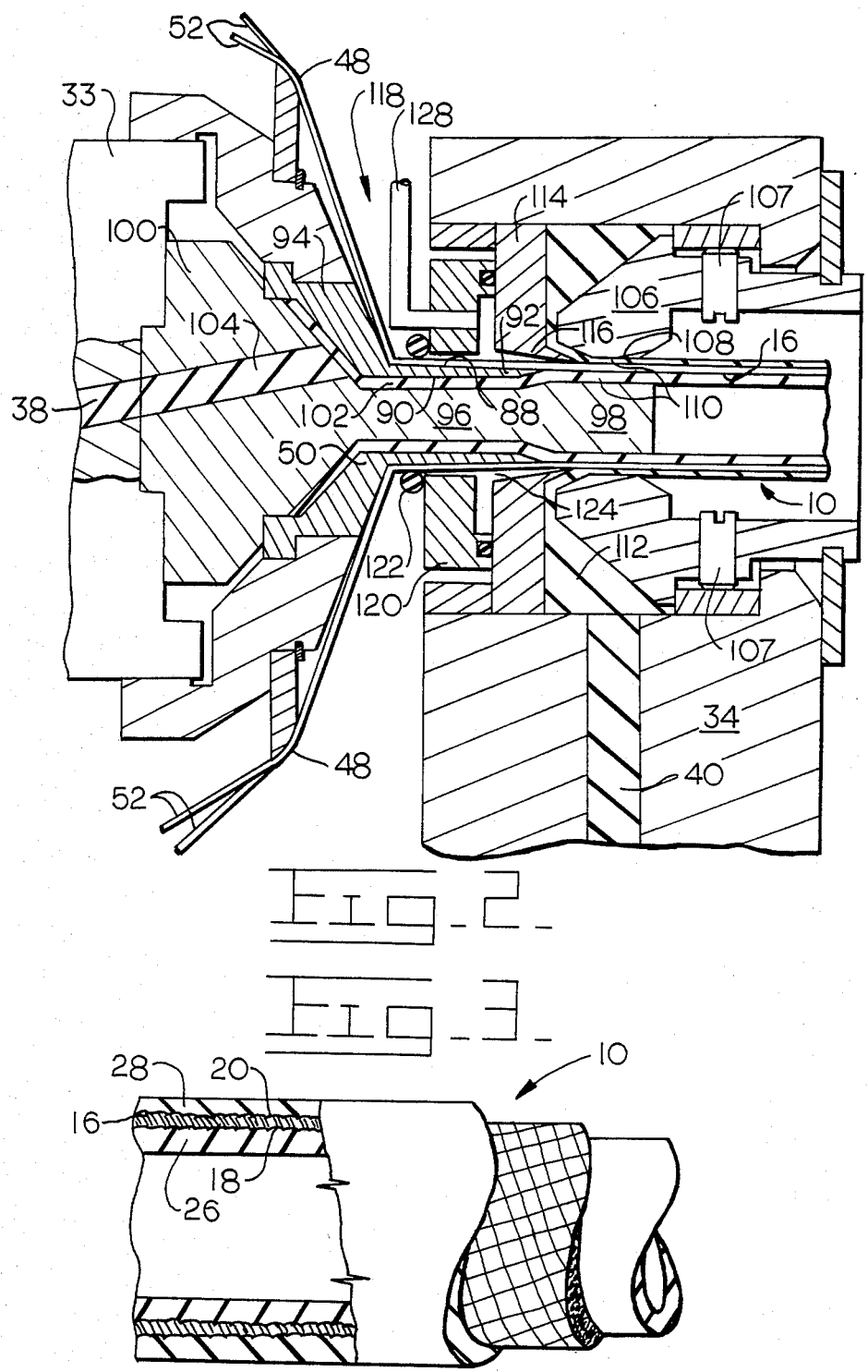

METHOD AND APPARATUS FOR MAKING BRAIDED REINFORCED HOSE

DESCRIPTION

1. Technical Field

This invention relates generally to the manufacturing of hose and more particularly to the method and apparatus for making braided reinforced hose.

2. Background Art

Reinforced hose is used in applications requiring containment of fluids under high pressures. As is well known in the art, a braided reinforcement member provides sufficient strength for high pressure operations. It is desirable to have a finished reinforced hose with an optimum "neutral or locked angle" of approximately 54° 44'. This optimum angle restrains the hose from unwanted expansion in length or ballooning during pressurizing.

Several processes have been developed to manufacture braided fabric reinforced hose on a continuous basis. These normally require forming the liner at one location, followed by forming the fabric reinforcement member onto the liner at a different location, then forming a cover over the reinforcement member at yet another location followed by withdrawing and curing equipment. In order to braid a metal reinforcement on the hose in these processes, it is desirable to apply a fabric reinforcement to the liner prior to braiding the metal reinforcement on the hose. This is necessary due to the high tensile load exerted on the metal strands during the braiding operation. Without the fabric reinforcement, the metal strands would cut into and possibly through the liner material. As easily recognized, this process requires large amounts of manufacturing floor space to produce the braided reinforced hose thus adding to the cost of producing the hose.

Another process for continuous hosemaking forms a fabric reinforcing layer on a mandrel followed by pulling the reinforcing layer from the mandrel and simultaneously extruding an elastomeric material through an annular orifice positioned inwardly of the reinforcement layer at one end of the mandrel. The material for the outer layer is supplied by the elastomeric material being forced through the openings in the reinforced member. When making a high pressure hose, a tightly woven metal reinforced member is highly desirable. Consequently, the openings or interstices in a braided reinforcement member are too small to pass ample amounts of elastomeric materials for forming the outer cover. Furthermore, it is highly desirable to have the liner and cover made from different materials. For best performance of the hose, the properties of the liner should be different from those of the cover.

Other processes involve braiding a fabric reinforcement member onto an existing or prior formed inner liner at a predetermined braid angle followed by curing and taking up on a conventional take-up reel. These processes also require large amounts of floor space and the tightness of the braided member is limited to the ability of the liner not to collapse.

Still other hose making processes use yarn for braiding or a combination of yarn and metal to form a braided reinforcement member on a liner at a predetermined braid angle. The formed hose is heated to shrink the yarn which changes the braid angle to an angle nearer the locked angle of 54° and also to provide a more compact coverage of the reinforcement member over the liner. This process requires the use of a shrinkable yarn thus not applicable to using all metal strands which would result in a higher strength reinforcement member.

The present invention is directed to overcoming one or more of the problems as set forth above.

DISCLOSURE OF THE INVENTION

In one aspect of the present invention a method is provided for manufacturing a reinforced elastomeric hose. A tubular braided reinforcement member having inner and outer surfaces is continuously braided onto a mandrel at a preselected first braid angle. As the reinforcement member is progressively removed from a mandrel, an elastomeric liner is extruded onto the inner surface of the braided reinforcement member from a first extruder and an elastomeric cover is extruded onto the outer surface of the braided reinforcement member from a second extruder. The extruding of the elastomeric cover and liner occur at approximately the same axial location and adjacent the mandrel. The formed hose from the extruders is pulled through a curing apparatus at a linear rate that is faster than the rate of extruding the hose. The faster rate of pulling stretches the hose and changes the braid angle of the reinforcement member to a predetermined smaller braid angle. Upon releasing the pulling force on the elastomeric hose, the reinforcement member rebounds so that a predetermined optimum braid angle is achieved.

In another aspect of the present invention an apparatus is provided for forming a flexible reinforced hose. The apparatus includes a braiding machine adapted to continuously braid a reinforcement member having inner and outer surfaces on a mandrel. A first means is provided for extruding an elastomeric liner onto the inner surface of the reinforcement member as it is being progressively removed from the mandrel while a second means is provided for extruding an elastomeric cover onto the outer surface of the reinforcement member. The liner and cover are extruded at approximately the same axial location and adjacent an end portion of the mandrel. A curing means is provided for curing the hose after the hose exits the extruders and a haul-off means is provided for continuously pulling the hose through the curing apparatus at a linear rate faster than the rate of extruding the hose.

The present invention solves the problem of producing a continuously braided reinforced hose with an optimum braid angle by extruding both the liner and cover at approximately the same axial location that the braided reinforcement member is made and pulling the hose through the curing apparatus at a controlled rate. By continuously braiding the reinforcement member on a mandrel and progressively removing the braided member from the mandrel, the problem of requiring a preformed liner having sufficient strength in order not to collapse is overcome. Also, manufacturing space is saved by having the various operations completed at approximately the same location. These advantages help reduce the cost of making a high pressure hose.

BRIEF DESCRIPTION OF THE DRAWINGS

FIG. 1 is a diagrammatic illustration of an apparatus of an embodiment of the present invention;

FIG. 2 is a somewhat enlarged partial section view of a portion of the apparatus of FIG. 1 and illustrating components in more detail; and FIG. 3 is a diagrammatic illustration of a flexible reinforced hose produced by the apparatus of FIG. 1.

BEST MODE FOR CARRYING OUT THE INVENTION

Referring now to FIGS. 1 and 3 of the drawings, an apparatus for continuously forming a reinforced elastomeric hose 10 is generally indicated by the reference numeral 12. The apparatus 12 includes a conventional braid forming machine 14 which continuously produces a tubular braided reinforcement member 16 having inner and outer surfaces 18,20, first and second means 22,24 for extruding a liner 26 and a cover 28 from an elastomeric material, such as rubber, onto the reinforced member 16, a curing means 30 for curing the hose after the hose exits the extruders, and a haul-off means 32 for continuously pulling the hose through the curing media at a linear rate faster than the rate of extruding the hose.

The first and second means 22,24, for extruding the elastomeric material includes first and second extruders 33,34 mounted on a base 35, a die mechanism 36 having portions respectively connected to the extruders 33,34, and passages 38,40 respectively connecting the extruders 33,34 to the die mechanism 36. Each of the extruders 33,34 include an extruder screw 42 and a hopper 44 for supplying elastomeric materials to their respective extruders screws 42. Each of the extruder screws 42 is driven by any conventional manner such as by a motor 45. The second extruder 34 is adjustably mounted on the base 35 by an adjustment mechanism 46. The adjustment mechanism 46 provides both radial and axial adjustment of the second extruder 34 relative to the portion of the die mechanism 36 that is connected to the first extruder 33. The adjustment mechanism 46, as diagrammatically shown, includes a plurality of adjustment screws 47 positioned around the base of the second extruder 34 and the portion of the base 35 that receives the base of the second extruder 34. It should be recognized that other types of mechanisms could be used to adjust the mounting position of the second extruder 34 without departing from the essence of the invention.

The braiding machine 14 includes a guide ring 48 and a mandrel 50 on which the reinforced member 16 is formed. A plurality of elongated strands 52 (only a portion of which are shown), such as strands of metallic wire, are drawn from a plurality of bobbins 54 carried on rotating spindles on the braiding machine 14 and are directed in a predetermined pattern by the braiding machine across the guide ring 48 onto the mandrel 50. Half of the plurality of bobbins 54 rotate in an opposite direction relative to the other half so that the strands 52 are spirally wrapped on the mandrel 50 in an alternating overlapping interwoven relationship to continuously produce the braided tubular member 16. The braided tubular member 16 has a continuous circumferential surface and is made in a continuous linear length. Preferably, the strands 52 are positioned in an abutting relationship with one another to form a close knit braid which has a total initial coverage on the mandrel 50 allowing substantially no openings therebetween.

A drive mechanism 62 drives the braiding machine 14 and the haul-off means 32 proportional one to the other. The drive mechanism 62 includes a drive motor 64 mounted on the braiding machine 14 and a mechanical connection, diagrammatically illustrated by a dashed line 66, connecting the braiding machine 14 and the haul-off means 32 to the drive motor 64.

The haul-off means 32 preferably includes a plurality of pulling and guiding devices 68, 70 and 72. However it is recognized that all but one of the pulling and guiding devices 68,70,72 could merely be guiding devices and not actually pulling the hose. The curing means 30 includes a tank 73 filled with a salt solution 74. The first pulling and guiding device 68 of the plurality of devices is located between the curing tank 73 and the die mechanism 36 and includes a roller 75 mounted on a trunnion 77. The roller 75 is drivingly connected to the mechanical connection 66. The second pulling and guiding device 70 is located within the curing tank 73 and includes a conveyor system 76 linearly located in the tank 73. The conveyor system 76 is also drivingly connected to the mechanical connection 66. The third pulling and guiding device 72 is located downstream of the curing tank 73 and includes a pair of pinch rollers 78 which are drivingly connected to the mechanical connection 66.

A rinse tank 82 and a hose take-up reel 84 are positioned after the third pulling and guiding device 72. The take-up reel 84 may be driven by any suitable means such as a motor 86.

Referring more specifically to FIG. 2, the mandrel 50 includes a tapered outer surface 88 and a bore 90. The mandrel 50 has a first end portion 92 terminating in the die mechanism 36 and has a second end portion 94 connected to the first extruder 33.

The die mechanism 36 includes an internal shaping member 96. The internal shaping member 96 extends through the bore 90 of the mandrel 50 and has the first end portion 98 extending beyond the first end portion 92 of the mandrel 50 and has a second end portion 100 which is connected to the first extruder 33. A cavity 102 is defined between the bore 90 of the mandrel 50 and the internal shaping member 96. The cavity 102 is connected to the passage 38 through a port 104 located in the second end portion 100 of the internal shaping member 96.

The die mechanism 36 further includes an external shaping member 106 located on the second extruder 34. The external shaping member 106 is adjustably positioned on the second extruder 34 by a plurality of screws 107. The external shaping member 106 has an inside portion 108 at one end which is radially disposed about the first end portion 98 of the internal shaping member 96. An annular space 110 is defined between the first end portion 98 of the internal shaping member 96, the inside portion 108 of the external shaping member 106, and the first end portion 92 of the mandrel 50. A chamber 112 connects the annular space 110 with the passage 40 of the second extruder 34. The chamber 112 is formed by the end of the external shaping member 106 and a guide collar 114. An internal portion 116 of the guide collar 114 is radially disposed about a portion of the first end portion 98 of the internal shaping member 96.

A means 118 is provided for evacuating entrained air between the liner 26 and cover 28 during the extrusion of the liner and cover. The means 118 for evacuating includes an annular element 120 radially disposed about the mandrel 50 and the reinforcement member 16 and is in sealing engagement with the guide collar 114 on the side opposite the chamber 112. A sealing element, such as an O-ring 122 is disposed about the mandrel 50 and the reinforcement member 16 and is in intimate contact with an outside portion of the annular element 120. The element 120 and the guide collar 114 defines a chamber 124 which is in communication with the space 110 provided beyond the first end portion 92 of the mandrel 42. A vacuum pump 126, see FIG. 1, is connected to the chamber 124 by a conduit 128. The vacuum pump 126 can be driven by any suitable means such as an electric motor (not shown).

Preferably, the haul-off means 32 includes the first, second and third pulling and guiding devices 68,70,72. However, it is recognized that the haul-off means 32 could be accomplished with only the third pulling and guiding device 72 or any combination thereof without departing from the essence of the invention. Furthermore, the curing means 30 illustrates and teaches a tank 73 having a salt solution 74 therein for curing the hose 10. It should be recognized that other types of continuous curing could be used with this apparatus. In the preferred embodiment as shown, the vacuum pump 126 evacuates the air from the region between the liner 26 and cover 28 just prior to the extrusion of the liner and cover. However, in some forms of curing hose such as an autoclave, it would not be necessary to provide the means for evacuating the entrained air.

Industrial Applicability

In the use of the apparatus 12, the braiding machine 14 braids the strands of wire 52 onto the mandrel 50 to continuously form the reinforcement member 16. The braiding of the strands 52 onto the larger end of the tapered surface 88 results in the closely knit braid which allows substantially no openings therebetween. This 100% coverage produces an initial or first braid angle of approximately 68° and the action of the strands 52 being laid adjacent one another plus the lead of the strands 52 being laid onto the tapered mandrel 50 results in the reinforcement member 16 being progressively pushed towards the smaller end of the tapered surface 88 as a result of the braiding function. As the braided member 16 moves towards the smaller end of the mandrel 50, the braid angle changes to a smaller, second braid angle, such as for example approximately 50° when it leaves the mandrel 50. After the braided reinforcement member 16 leaves the first end portion 92 of the mandrel 50 and enters the annular space 110, the liner 26 is extruded onto the inner surface 18 of the reinforcement member 16. This is accomplished by the elastomeric material, such as rubber, being extruded into the annular space 110 just beyond the first end portion 92 of the mandrel 50 through the passage 38, port 104 and cavity 102. The first end portion 98 of the internal shaping member 96 forms the internal surface of the liner 26 while the outer portion of the liner 26 is formed by the inner surface 18 of the reinforcement member 16. Due to the high pressure used for extruding the liner 26, for example 13,800 kPa (2000 psi), the rubber flows into the small interstices filling any spaces thus providing a rubber cushion between some of the strands 52. Furthermore, the rubber adheres to the strands 52 and during the curing process the rubber bonds to the strands 52. This "consolidation" of the liner 26 and the braided member 16 results in a hose 10 which better endures large, continuous fluctuations that occur in high pressure systems.

At approximately the same axial location the cover 28 is formed over the reinforcement member 16 by the elastomeric material being extruded into the annular space 110 from the second extruder 34 through the passage 40 and the chamber 112. In this embodiment, the pressure for extruding the cover 28 is less than the extruding pressure used for the liner 21, for example 10,350 kPa (1500 psi). It should be recognized that the extruding pressures could be the same or at other pressure levels without departing from the essence of this invention. The inside portion 108 of the external shaping member 106 forms the outside surface of the cover 28.

By having the braided member 16 formed on the mandrel 50 and being continuously forced off of the mandrel 50 at a rate dependent on the braiding speed, the extrusion of the liner 26 and cover 28 is completed very close to the first end portion 92 of the mandrel 50. This compactness of operations minimizes floor space while continuously producing a reinforced hose having a braided reinforcement member with a continuous circumferential surface.

Even though the preferred embodiment teaches the extrusion of both the liner 26 and cover 28 closely adjacent the mandrel 50, it should be recognized that the axial distance for extruding the liner 26 and cover 28 relative to the mandrel 50 is limited only by the ability to extend the first end portion 98 of the internal shaping member 96 further into the formed braided member 16 and the routing of the elastomeric material through the internal shaping member 96.

The concentricity of the liner 26 and cover 28 with the braided member 16 is maintained by controlling the relationship of the external shaping member 106 and the guide collar 114 relative to the first end portion 98 of the internal shaping member 96 and the mandrel 50. Since the external shaping member 106 and the guide collar 114 are mounted on the second extruder 34, the adjustment mechanism 46 can simultaneously adjust the external shaping member 106 and guide collar 114 in all directions. Furthermore the plurality of screws 107 can radially adjust the external shaping member 106 relative to the guide collar 114.

As a result of a higher extrusion pressure utilized in forming the liner 26 as compared to the extrusion pressure used in forming the cover 28, the reinforcement number 16 expands resulting in the braid angle changing to a larger, third braid angle, for example approximately 58°. It is recognized that the extrusion pressures for extruding the liner 26 and cover 28 could be varied to different levels or could be the same pressure. The degree of expansion of the reinforcement member 16 is limited both by the difference in the extrusion pressures and by the change of the braid angle. As the braid angle increases in size, the interstices become smaller consequently closing off any further flow of the high viscous elastomeric material through the interstices. This action aids the reinforcement member 16 in resisting any further expansion.

The vacuum pump 126 draws air from the chamber 124 which removes entrained air from the annular space 110 adjacent the end portion 92 of the mandrel 50 thus reducing the air in the space 110 just prior to the liner 26 and cover 28 being extruded onto the reinforcement member 16. The "O" ring 122 disposed about the mandrel 50 and braided member 16 seals the opening between the annular element 120 and the braided member 16 while providing freedom of movement of the braided member 16 towards the first end portion 92 of the mandrel 50.

As the reinforced hose 10 leaves the die mechanism 36, the haul-off means 32 pulls the hose 10 at a linear rate faster than the rate of extruding the hose which stretches the hose thus changing the braid angle of the braided member 16. The increased linear rate produced by the haul-off means 32 is faster than the rate that the hose is being made and more specifically to the rate that the reinforcement member 16 is being produced. After leaving the extruders 33, 34 the hose is pulled at a linear rate sufficient to change the braid angle to a predetermined smaller braid angle, such as for example approximately 53° and cured in the curing means 30 while being held at the predetermined smaller braid angle.

Furthermore, as the hose leaves the die mechanism 36, it passes over the roller 75 which serves to guide the hose 10 into the curing tank 53 and simultaneously the roller 75 produces a portion of the linear rate increase. It is preferred that the roller 75 and the linear rate of the hose passing over the roller 75 be the same and not allow any slippage between the roller 75 and the hose 10. From the roller 75 the hose is directed into the salt bath 74 and directed under the conveyor system 76 which guides the hose through the salt bath solution 74 and simultaneously maintains the hose submerged in the salt bath solution throughout the length of the tank 73. A portion of the linear rate increase of the hose may be provided by the conveyor system 76 by controlling the proportionality of the drive mechanism 62 through the mechanical connection 66.

The pinch rollers 78 provide the final portion of the linear rate increase of the haul-off means 32. The hose 10 passes between the pinch rollers 78 after leaving the curing means 30 and is passed therethrough into the rinse tank 82. It should be recognized that the pinch rollers 78 could provide all of the pulling force subjected to the hose 10 while the roller 75 and conveyor system 76 could be serving only as guides for the hose.

The rinse tank 82 serves to cool the hose 10 and also to remove residue from the hose that may have been deposited thereon while the hose was in the salt bath solution 74. The hose is taken up on the reel 84 after it leaves the rinse tank 82. It may be desirable to dry the hose prior to it being taken up on the reel 84. The motor 86 drives the take-up reel 84 at a rate sufficiently fast to take up the hose from the rinse tank 82 without subjecting the hose 10 to any stretching force.

After the hose 10 leaves the pinch rollers 78 there is no pulling force being subjected to the hose. Consequently, the hose will rebound thus changing the braid angle to an optimum braid angle of approximately 54° 44'. The rebound of the hose is related to the tendency of the strands 52 forming the braid to want to return to its original straight length as opposed to the spiral lead that it was subjected to during the braiding operation and also related to the cooling of the hose within the rinse tank 82. By stretching the hose following the extrusion and during the curing, the braid angle is changed to the smaller predetermined braid angle. Then, following the subsequent release and cooling of the hose, the hose rebounds to the optimum braid angle.

Thus the method of manufacturing a reinforced elastomeric hose comprises the steps of braiding a tubular reinforcement member on a mandrel at a first braid angle, removing the reinforcement member from the mandrel, extruding an elastomeric liner from a first extruder onto the inner surface of the braided reinforcement member, extruding an elastomeric cover from a second extruder onto an outer surface of the braided reinforcement member at approximately the same location of extruding the liner on the inner surface and adjacent the mandrel, curing the elastomeric hose after exiting the extruders, withdrawing the elastomeric hose from the extruders through the curing apparatus at a linear rate faster than the rate of extruding the hose for changing the braid angle for the reinforcement member to a predetermined smaller braid angle, and releasing the pulling force on the elastomeric hose to free the reinforcement member to rebound so that a predetermined optimum braid angle is achieved. The method further includes the step of removing entrained air between the liner and cover during the steps of extruding the elastomeric liner and cover. The method also includes forming the liner and the cover during the steps of extruding the liner and the cover. The method additionally includes the step of adjusting the position of one of the extruders to adjust the concentricity of the liner and cover relative to the reinforcement member.

In view of the foregoing, it is readily apparent that the method and apparatus provides a continuous hose manufacturing process that does not require large amounts of manufacturing floor space. It also provides the apparatus to continuously braid a high strength reinforcement member on the mandrel closely followed by the extrusion of the cover and liner at approximately the same axial location. By driving the haul-off means at a faster rate than the rate of extruding, the braid angle is changed to the predetermined braid angle so that upon release of the haul-off force the hose rebounds to the optimum braid angle.

Other aspects, objects and advantages of this invention can be obtained from a study of the drawings, the disclosure and the appended claims.

I claim:

1. A method of manufacturing a reinforced elastomeric hose (10), comprising the steps of:
braiding a tubular reinforcement member (16) on a tapered mandrel (50) at a first braid angle, said reinforcement member (16) having inner and outer surfaces (18, 20);
progressively pushing the reinforcement member (16) from the mandrel (50) in response to the braiding action;
extruding and forming an elastomeric liner (26) from a first extruder (33) onto the inner surface (18) of the braided reinforcement member (16) after it leaves the mandrel;
extruding and forming an elastomeric cover (28) from a second extruder (34) onto the outer surface (20) of the braided reinforcement member (16), said extruding of the elastomeric liner (26) and cover (28) occurring at approximately the same axial location and adjacent the mandrel (50);
progressively curing the elastomeric hose (10) after exiting the extruders (33,34);
changing the braid angle of the reinforcement member (16) to a predetermined braid angle smaller than an optimum braid angle by pulling the elastomeric hose (10) after it exits the second extruder through the curing apparatus (30) at a linear rate fastener than the rate of extruding the hose (10); and
obtaining the predetermined optimum braid angle by releasing the pulling force on the elastomeric hose (10) after curing to free the braids of the reinforcement member (16) to rebound to the predetermined optimum braid angle.

2. The method, as set forth in claim 1, wherein the step of pushing the reinforcement member (16) from the mandrel (50) includes reducing the braid angle to a second braid angle; and the step of extruding the elastomeric liner on the reinforcement member (16) includes increasing the braid angle to a third braid angle.

3. An apparatus (12) for forming an elastomeric reinforced hose (10), comprising:

a tapered mandrel (50) having an end portion (92);

a braiding machine (14) adapted to continuously braid a reinforcement member (16) on the tapered mandrel (50) and progressively push the reinforcement member (16) from the tapered mandrel (50) by the braiding action, the reinforcement member (16) having inner and outer surfaces (18,20);

first means (22) for extruding an elastomeric liner (26) onto the inner surface (18) of the reinforcement member (16) as it is being pushed from the mandrel by the braiding action;

second means (24) for extruding an elastomeric cover (28) onto the outer surface (20) of the reinforcement member (16), said liner (26) and cover (28) being extruded at approximately the same axial location and adjacent the end portion (92) of the tapered mandrel (50);

curing means (30) for curing the hose (10) after the hose exits the extruders (33,34); and haul-off means (32) for continuously pulling the hose after it exits the second extruder through the curing means at a linear rate faster than the rate of extruding the hose (10) to change the braid angle to a braid angle smaller than an optimum braid angle and releasing the pulling force on the hose after curing to free the braids of the reinforcement member (16) to rebound so that the optimum braid angle is achieved.

4. The apparatus (12), as set forth in claim 3, wherein said apparatus (12) includes a drive mehanism (62) adapted to drive the haul-off means (32) at a rate proportionally faster than the linear rate that the hose exits the second extruder.

5. The apparatus (12), as set forth in claim 1, wherein the curing means (30) includes a tank (73) containing a salt solution (74).

6. The apparatus (12), as set forth in claim 5, wherein the haul-off means (32) includes a plural of pulling and guiding devices (68,70,72) adapted to apply a pulling force on the hose (10) after the hose exits the first and second extruding means (22,24).

7. The apparatus (12), as set forth in claim 6, wherein the first (68) of the plurality of pulling and guiding devices includes a roller (75) mounted on a trunnion (76), and a mechanical connection (66) drivingly connects the roller (75) to the drive mechanism (62), said roller (75) being located between the first and second extruding means (22,24) and the curing tank (73).

8. The apparatus (12), as set forth in claim 7, wherein the second (70) of the plurality of pulling and guiding devices includes a conveyor system (76) located within the curing tank (73), said conveyor system (76) being drivingly connected to said mechanical connection (66).

9. The apparatus (12), as set forth in claim 8, wherein the third (72) of the plurality of pulling and guiding devices includes a pair of pinch rollers (78), drivingly connected to said mechanical connection (66) and being adapted to pull the hose (10) through the tank (73).

10. The apparatus (12), as set forth in claim 3, including an adjustment mechanism (46) adapted to adjust the axial and radial location of one of the first and second extruding means (22,24) relative to the other for producing concentricity between the liner (26) and cover (28) and the braided member (16).

11. The apparatus (12), as set forth in claim 5, wherein the haul-off means (32) includes a plurality of pulling and guiding devices adapted to guide the hose (10) and to apply a pulling force on the hose (10) after the hose exits the extruders (33, 34), at least one of the plurality of pulling and guiding devices is a roller mechanism adapted to pull the hose (10) through the curing means (30).

* * * * *

UNITED STATES PATENT AND TRADEMARK OFFICE
CERTIFICATE OF CORRECTION

PATENT NO. : 4,517,039

DATED : May 14, 1985

INVENTOR(S) : Ronald L. Satzler

It is certified that error appears in the above-identified patent and that said Letters Patent is hereby corrected as shown below:

Column 8, line 58: delete "fastener" and insert --faster--.

Column 10, line 1: delete "1" and insert --4--.
          line 5: delete "plural" and insert --plurality--.

Signed and Sealed this

Tenth Day of September 1985

[SEAL]

*Attest:*

DONALD J. QUIGG

*Attesting Officer*     *Acting Commissioner of Patents and Trademarks - Designate*